(12) United States Patent
Blazer et al.

(10) Patent No.: US 11,656,419 B2
(45) Date of Patent: May 23, 2023

(54) HIGH DENSITY FIBER OPTIC RIBBON CABLE

(71) Applicant: CORNING RESEARCH & DEVELOPMENT CORPORATION, Corning, NY (US)

(72) Inventors: Bradley Jerome Blazer, Granite Falls, NC (US); David Alan Seddon, Hickory, NC (US); Rebecca Elizabeth Sistare, Hickory, NC (US); Kenneth Darrell Temple, Jr., Newton, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/335,220

(22) Filed: Jun. 1, 2021

(65) Prior Publication Data
US 2021/0389537 A1    Dec. 16, 2021

Related U.S. Application Data

(63) Continuation of application No. PCT/US2019/063152, filed on Nov. 26, 2019.

(60) Provisional application No. 62/776,196, filed on Dec. 6, 2018.

(51) Int. Cl.
*G02B 6/44*    (2006.01)

(52) U.S. Cl.
CPC ............. *G02B 6/443* (2013.01); *G02B 6/448* (2013.01)

(58) Field of Classification Search
CPC .................. G02B 6/443; G02B 6/448
USPC .......................................... 385/114
See application file for complete search history.

(56) References Cited

U.S. PATENT DOCUMENTS

| | | | | |
|---|---|---|---|---|
| 5,162,397 | A * | 11/1992 | Descamps | C08L 83/04 521/154 |
| 5,615,293 | A | 3/1997 | Sayegh | |
| 6,226,431 | B1 * | 5/2001 | Brown | G02B 6/4411 385/112 |
| 6,321,013 | B1 * | 11/2001 | Hardwick, III | G02B 6/4411 385/112 |
| 6,404,962 | B1 | 6/2002 | Hardwick et al. | |
| 6,748,146 | B2 | 6/2004 | Parris | |
| 7,742,117 | B2 | 6/2010 | Lee et al. | |
| 8,229,263 | B2 | 7/2012 | Parris et al. | |
| 8,238,706 | B2 | 8/2012 | Kachmar | |

(Continued)

FOREIGN PATENT DOCUMENTS

| AU | 2006232206 A1 | 10/2006 |
|---|---|---|
| CN | 106461899 A | 2/2017 |

(Continued)

OTHER PUBLICATIONS

International Search Report and Written Opinion of the International Searching Authority; PCT/US2019/063152 dated Apr. 27, 2020, 13 pages; European Patent Office.

(Continued)

*Primary Examiner* — Jerry M Blevins
(74) *Attorney, Agent, or Firm* — William D. Doyle (57) ABSTRACT

A fiber optic cable includes a stranded ribbon stack, a sheath extruded around the stranded ribbon stack to form a subunit, and an extruded foam layer, wherein the foam layer has a minimum inner diameter that is less than or equal to a maximum stack diagonal dimension of the stranded ribbon stack.

20 Claims, 4 Drawing Sheets

(56) References Cited

U.S. PATENT DOCUMENTS

| | | |
|---|---|---|
| 8,620,124 B1 | 12/2013 | Blazer et al. |
| 8,687,930 B2 | 4/2014 | McDowell et al. |
| 10,031,302 B2 | 7/2018 | Ji et al. |
| 2003/0013778 A1 | 1/2003 | Sueda et al. |
| 2004/0076386 A1 | 4/2004 | Nechitailo |
| 2004/0240808 A1 | 12/2004 | Rhoney et al. |
| 2004/0249009 A1 | 12/2004 | Homma et al. |
| 2004/0252954 A1* | 12/2004 | Ginocchio ............. G02B 6/443 385/100 |
| 2005/0213902 A1 | 9/2005 | Parsons |
| 2006/0127016 A1 | 6/2006 | Baird et al. |
| 2008/0020532 A1 | 1/2008 | Monfray et al. |
| 2009/0317039 A1 | 12/2009 | Blazer et al. |
| 2010/0232753 A1* | 9/2010 | Parris ................... G02B 6/4494 385/109 |
| 2011/0069932 A1* | 3/2011 | Overton ................ G02B 1/048 385/100 |
| 2011/0091171 A1 | 4/2011 | Tatat et al. |
| 2012/0251060 A1* | 10/2012 | Hurley ............. B29D 11/00663 385/102 |
| 2013/0094821 A1 | 4/2013 | Logan |
| 2015/0110451 A1* | 4/2015 | Blazer ................. G02B 6/4435 385/103 |
| 2015/0268430 A1 | 9/2015 | Bringuier et al. |
| 2015/0309274 A1 | 10/2015 | Hurley et al. |
| 2016/0216468 A1* | 7/2016 | Gimblet ................. G02B 6/443 |
| 2017/0276891 A1 | 9/2017 | Esseghir et al. |
| 2017/0343752 A1 | 11/2017 | Ji et al. |
| 2018/0180831 A1 | 6/2018 | Blazer et al. |
| 2018/0252882 A1 | 9/2018 | Baucom et al. |

FOREIGN PATENT DOCUMENTS

| | | |
|---|---|---|
| EP | 0782025 A1 | 7/1997 |
| EP | 1085357 A2 | 3/2001 |
| EP | 1243957 A2 | 9/2002 |
| WO | 2009/154990 A2 | 12/2009 |
| WO | 2016/073862 A2 | 5/2016 |
| WO | 2017/205190 A1 | 11/2017 |
| WO | 2018/102330 A1 | 6/2018 |

OTHER PUBLICATIONS

European Patent Application No. 19892779.0, European Search Report, dated Jul. 7, 2022; 11 pages; European Patent Office.

Chinese Patent Application No. 201980089229.8, Office Action dated Oct. 8, 2022, 9 pages (4 pages of English Translation and 5 pages of Original Document), Chinese Patent Office.

* cited by examiner

HIGH DENSITY FIBER OPTIC RIBBON CABLE

This application is a continuation of International Application No. PCT/US2019/063152 filed on Nov. 26, 2019, which claims the benefit of priority under 35 U.S.C. § 119 of U.S. Provisional Application Ser. No. 62/776,196 filed on Dec. 6, 2018, the content of which is relied upon and incorporated herein by reference in its entirety.

BACKGROUND

The disclosure relates generally to optical communication cables and more particularly to optical communication cables with high fiber densities and outside diameters configured to fit into ducts of specified dimensions. High fiber count optical communication cables may be used, for example, in hyper data center applications where the demand for fiber count in a single cable may exceed 3,000 fibers. Yet the need exists to use existing ducts having small inside diameters for routing of these high fiber density cables.

Today's conventional ribbon cables are based on technologies that have changed very little for nearly twenty years. For example, conventional 216 fiber ribbon stacks typically comprise eighteen 12 fiber ribbons. Larger fiber count cables, such as an 864 fiber cable, may comprise a combination stack of 24 fiber and 36 fiber ribbons. As cable prices have decreased over the years, cable installation costs have continued to increase. Accordingly, there is a desire to put more fibers in the same space in order to reduce total installed costs.

The trend is toward smaller diameter cables and/or the most fibers possible that can fit inside a given diameter duct space. Cable suppliers have been working on higher fiber density cable solutions, resulting in, for example, 2000 fiber cable solutions with cable diameters similar to the 1000 fiber cable solutions of yesteryear.

Some such cable solutions rely on rollable ribbon concepts, which incorporate, for example, intermittent webs lightly tacking the fibers together to create flexible ribbons that can be more easily rolled to conform to high density packing in a cable jacket or duct. However, the rollable ribbon concepts impact the ease and handling of the ribbons during mass fusion splicing. To enable easier handling for splicing in the field, a high-density ribbon stack cable is needed with ribbons that retain at least some of the solid structure of conventional ribbons when compared to the rollable ribbon solutions, for example.

SUMMARY

Conventional ribbon cables typically comprise stacks of 12/24/36 fiber ribbons of 250 μm fibers situated in one (central) buffer tube or a plurality of buffer tubes that are surrounded by armor and/or a protective jacket. The buffer tube is typically a somewhat hard, plastic tube designed to encapsulate and protect the fiber ribbons from stress or microbending when the cable is moved or flexed by external forces or by thermal expansion and contraction. These ribbon cables typically rely on free space between the ribbon stack and the buffer tube to meet fiber attenuation requirements in mechanical and environmental testing. However, free space, as well as the thickness of the wall of the buffer tube itself, increases the overall cable outside diameter.

To increase the number of fibers in a ribbon cable while at the same time reducing the size (i.e., outside diameter) of the cable, cables in accordance with aspects of the present disclosure remove the buffer tube and allow the armor and/or protective jacket to engage the ribbon stack during crush or bending. The ribbon cables disclosed herein include a ribbon stack with a thin layer of polymer material extruded about the ribbon stack to maintain stack integrity while providing a flexible, routable subunit. A foam layer is extruded in-process to form a cylinder about the subunit with no point of separation, and a single polymeric jacket is extruded to encapsulate the foam cylinder and the subunit in the cable core.

In accordance with other aspects of the present disclosure, the ribbon cables may include an armor layer having two pieces of armor that surround the foam cylinder and is bonded to the jacket. In accordance with yet other aspects of the present disclosure, the jacket of these ribbon cables may include non-round strength elements embedded in the cable jacket to provide required tensile strength and anti-buckling while also reducing the required jacket wall thickness. Moreover, the jacket may also include co-extruded features of dissimilar material that provide improved access to the cable core.

DETAILED DESCRIPTION

Figure 1:
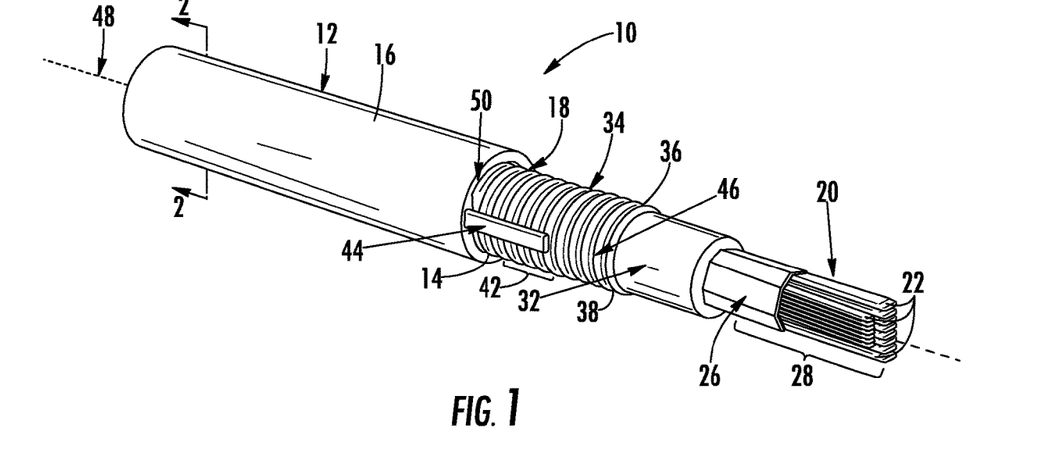
FIG. 1 is an isometric view of a fiber optic cable in accordance with aspects of the present disclosure.
Figure 2:
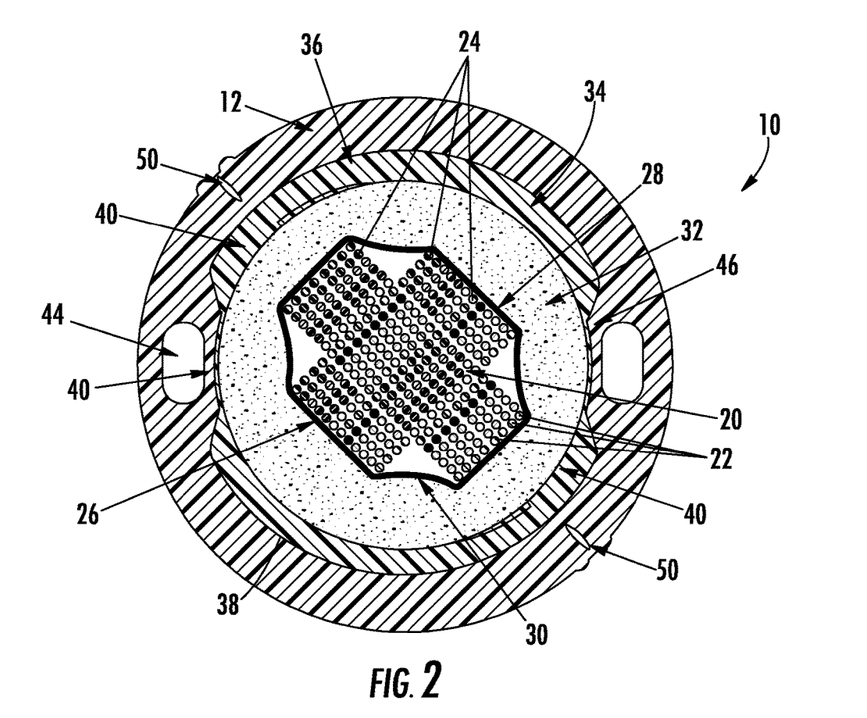
FIG. 2 is a cross-sectional view of the fiber optic cable of FIG. 1 taken along line 2-2 in accordance with aspects of the present disclosure.

FIGS. 1 and 2 depict an embodiment of an optical fiber cable 10. The optical fiber cable 10 includes a cable jacket 12 having an inner surface 14 and an outer surface 16. The outer surface 16 defines an outermost surface of the optical fiber cable 10. The inner surface 14 of the cable jacket 12 defines a longitudinal bore 18. Disposed within the bore 18 are optical communication elements. In the embodiment depicted, the optical communication elements include a stack 20 of optical fiber ribbons 22. Each optical fiber ribbon 22 includes a plurality of optical fibers 24 arranged in a planar configuration and bound together, e.g., with a matrix material. In embodiments, the stack 20 includes, e.g., from one to thirty-two optical fiber ribbons 22. In embodiments, each optical fiber ribbon 22 includes from four to thirty-six optical fibers 24. Thus, in embodiments, the optical fiber cable 10 may include, e.g., anywhere from four to 864 optical fibers 24 in the bore 18.

In accordance with aspects of the present disclosure, as depicted in FIGS. 1 and 2, the stack 20 of optical fiber ribbons 22 may include a sheath 26 of polymer material extruded about the ribbon stack 20 to maintain stack integrity while providing a flexible, routable subunit 28. This peelable sheath 26 allows for ribbon stack integrity and subunit routing, while also allowing for stack twist-tightening during cable bending.

The sheath 26 may be made of a peelable plasticized polyvinyl chloride (PVC) material tightly extruded to surround the ribbon stack 20. The sheath 26 may be a single extruded layer of plasticized PVC that is both thin (e.g., a thickness of between 0.15 mm and 0.5 mm, preferably about 0.25 mm) and comprised of a soft material that easily separates by manually pinching the sheath material.

The extruded sheath 26 is tight in that it conforms to the shape of the ribbon stack 20 and keeps all the individual ribbons 22 acting as a whole during longitudinal translation within the subunit 28 inside the cable 10 during cable bending. By maintaining all the ribbons 22 acting as a whole, the core subunit 28 in accordance with aspects of this disclosure keeps any one ribbon 22 from buckling during cable bending. The ability of the sheath 26 to perform this function would also keep any one fiber in a rollable ribbon format from buckling during subunit longitudinal translation. Although embodiments disclosed herein may have an entirely continuous sheath 26, i.e., whole simultaneously in a radial and a longitudinal direction along the entire length or substantially the entire length of the cable, embodiments may also include a sheath 26 having non-continuous features, such as holes, windows, slits, or gaps, for example, such that a surface area of the sheath 26 with the non-continuous features is at least 50% of the surface area if the sheath 26 was entirely continuous.

Figure 8:
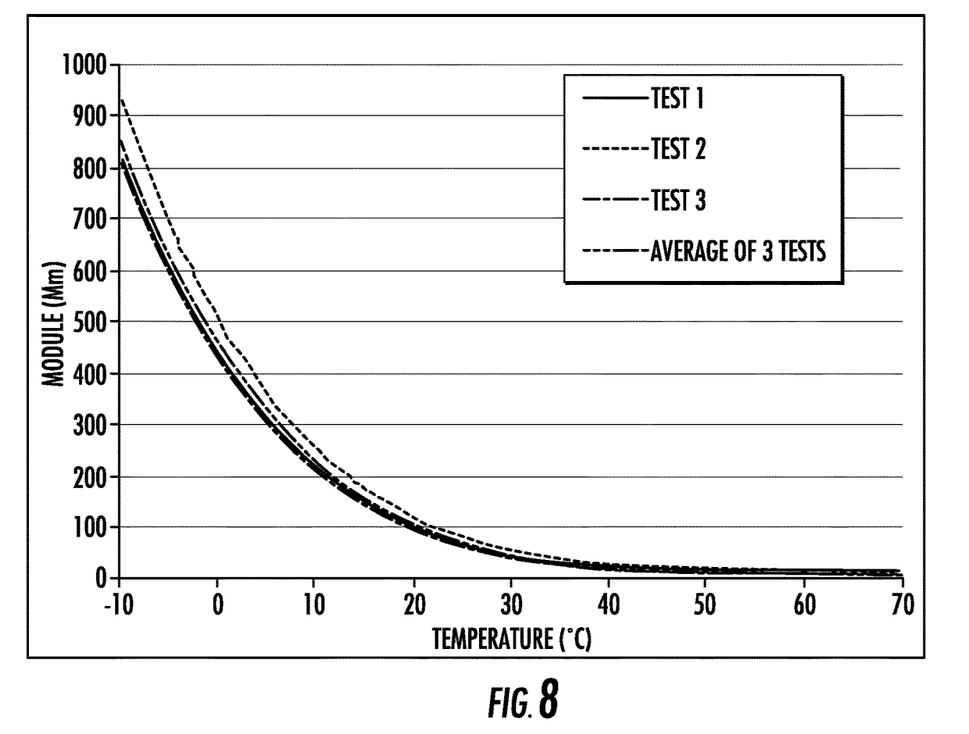
FIG. 8 is a table illustrating the elastic modulus of an exemplary cable sheath (comprising a plasticized PVC material) with respect to temperature, in accordance with aspects of the present disclosure.

FIG. 8 illustrates the elastic modulus of sheath 26 (comprising a plasticized PVC material) with respect to temperature. As indicated in FIG. 8, the elastic modulus of sheath 26 at room temperature is less than 100 MPa and rises to only approximately 800 MPa at cold temperatures (e.g., −10° C.). Comparatively, a typical fiber optic cable jacket or buffer tube, such as one comprising a medium density polyethylene (MDPE) material, has a higher modulus than 800 MPa at room temperature.

Combined with the thin walls of the sheath 26, an EA (modulus×cross-sectional area) of the sheath 26 is very low. The material properties of the extruded sheath 26 ensure the sheath 26 does not create undue normal force against the ribbon stack 20. In accordance with yet other aspects of the present disclosure, a vacuum may be applied to the extrusion line to cause the sheath 26 to be pulled down more tightly against the ribbons 22 of the ribbon stack 20. As shown in FIG. 2, the sheath 26 may form concave bridging portions 30 at the step locations of the ribbon stack 20. Vacuum extruding the sheath 26 substantially reduces the free space in the subunit 28 as compared to a conventionally extruded buffer tube. Moreover, during cold temperature cycles, and in combination with the stepped shape of the ribbon stack 20, the vacuum fitted sheath 26 provides the ability to stretch to prevent normal forces being applied against the ribbon stack 20 by the sheath 26.

The conformal sheath 26 has a fiber fill ratio greater than the maximum fill ratio of a round tube. As a result, the conformal sheath 26 may rotate with the ribbon stack due to mechanical interference associated with the non-circular shape of the ribbon stack 20. The sheath 26 also secures the relative position of each ribbon 22 within the ribbon stack 20 and presents a consistent boundary between the edges of the ribbon stack 20 and surrounding cable elements.

Figure 3:
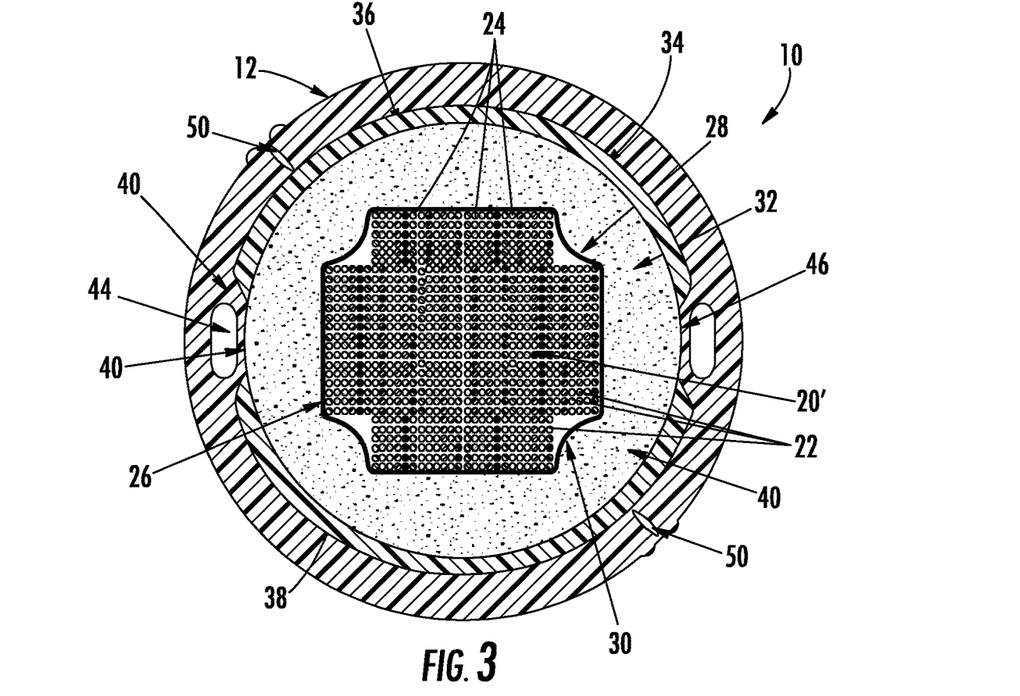
FIG. 3 is a cross sectional view of a fiber optic cable having all the same elements as the fiber optic cable shown in FIGS. 1 and 2, except with a different ribbon stack configuration, in accordance with aspects of the present disclosure.

As shown in FIGS. 1 and 2, the sheath 26 may be extruded around a stack of conventional ribbons 22 arranged in a stepped configuration, where the ribbons are two different widths (e.g., 12F ribbons and 24F ribbons). As shown in FIG. 2, the ribbons 22 may be stacked with a central grouping of eight 24F ribbons and a group of four 12F ribbons provided on each side of the central grouping for a total of 288F in the ribbon stack 20. However, the extruded sheath 26 may be applied to any of a number of fiber stack arrangements, for example a ribbon stack of one ribbon width (e.g., 12×12F ribbons), or as shown in FIG. 3, a ribbon stack 20' having 864F arranged with a central group of sixteen 36F ribbons surrounded on each side by a group of six 24F ribbons. FIG. 3 is an illustration of the same cable 10 of FIGS. 1 and 2, with all of the same elements, except that the ribbon stack 20' in FIG. 3 is of a different configuration from the fibbon stack 20 shown in FIGS. 1 and 2.

Although the sheath 26 is described above as tight, at the same time the extruded sheath 26 is loose or just loose enough such that when a length of the subunit 28 is bent and coiled, the individual ribbons 22 are free to adjust themselves longitudinally with respect to each other, longitudinally translating inside or within the extruded sheath 26, relieving bending stresses and keeping the individual ribbons 22 from buckling. The special material of the sheath 26 does not squeeze radially or continue to squeeze radially and create normal forces between the ribbons or fibers that would hinder subunit 28 longitudinal translation.

The ribbon stack 20 may be stranded to twist longitudinally within the sheath 26. The stranded laylength of the ribbon stack 20 should be in the range of 300-900 mm depending on the fiber count (e.g., 12, 24 or 36 fiber ribbons).

The sheath 26 may be a continuously (radially and longitudinally continuous) applied thermoplastic material. Optical fibers and ribbons made from optical fibers have a high tensile rigidity due to the strength of the glass fibers but a low buckling threshold due the small diameter of each fiber. Bending performance is enhanced by stranding but the optical fibers must be able to slide by compressive force applied at distance of about ¼ of the stranding pitch without buckling to prevent signal loss. The conformal sheath 26 functions as a boundary to limit separation between the ribbons 22 within the stack 20 due to buckling forces during normal handling of the cable 10 or subunit 28. The continuous sheath 26 prevents localized ribbon or fiber buckling issues that can occur in cables with unbound ribbons or fibers or in cables with ribbon or fibers bound with binder yarns, for example, wherein there is sufficient free space or gaps for the fibers or ribbons to buckle through the binders. These macrobend events can be described as statistical outliers, where the majority of fiber length does not have a bend problem, but only a very small fraction of the length has a bend or buckling problem. Much of optical cable design and attenuation performance in standard loose tube fiber optic cables, or in cables with less than 50% area ratio comes down to managing outlier attenuation bends. For a fiber optic cable to have good attenuation in bending and tension during installation, handling, and lifetime operation, the fibers individually and in aggregate must be able to find a path to relieve bending stresses, whether tensile or contractive.

By having a subunit fiber density of 30% or greater, but more preferably 40%, or most preferably 50% or greater inside the continuous extruded sheath 26, individual fibers of a rollable ribbon cannot find their own path separate from the subunit group that would cause macrobending attenuation outliers. On the other hand, a ribbon stack 20 with high fiber density inside the extruded sheath 26 ensures that individual ribbons 22 are not capable of buckling. As shown in FIG. 2, a subunit 28 having a 288F ribbon stack 20 configuration as shown, i.e., a central grouping of eight 24F ribbons and a group of four 12F ribbons provided on each side of the central grouping, may have an inside the subunit fiber area ratio of 50% to 70%, meaning that 50%-70% of the entire area inside of sheath 26 is occupied by actual optical fibers and the remaining 30%-50% of inside area is primarily ribbon matrix material and/or limited free space.

The same ratios generally apply whether the fibers are 250 micron fibers or 200 micron fibers, although the inside area of the subunit 28 is reduced when using 200 micron fibers. Cable density can also be reviewed in terms of the jacket outer diameter and in terms of inside the jacket inner diameter.

Conventional stranded ribbon cable designs require free space for two main purposes. Free space allows the ribbon stack to move in and out of plane during cable bending, leaving space between the inside wall of the buffer tube and the ribbon stack to prevent attenuation on the corner fibers. As the free space is reduced, the ribbon stack is confined to a smaller range of planes during bending and will contact the inside of the hard buffer tube causing attenuation, particularly at the point loads on the corner fibers. Freespace also provides attenuation performance during crush testing. As the cable is crushed, the deflection of the cable/buffer tube causes similar point loads and attenuation on the corner fibers when freespace is minimal and the deflection is high.

To minimize these point loads during bending and crush testing, and to facilitate smaller diameter cables, foamed material can be used to disperse applied forces over a long length and across more fibers. However, the foamed material must still allow the subunit 28 (i.e., ribbon stack) to move in and out of plane during bending. These two competing functions require the foam material to have certain physical and mechanical properties for this cable to have acceptable optical performance.

As shown in FIGS. 1 through 3, for example, one of the cable elements surrounding the ribbon stack 20 may be an extruded foam layer 32. The foam layer 32 may be extruded in-process during manufacture of the cable, as compared to foam tapes applied in a separate process for many conventional designs. The foam layer 32 may be extruded directly on or about the ribbon stack subunit 28 to have no point of separation, radial or longitudinal. Accordingly, the foam layer 32 has a minimum inner diameter that is less than or equal to a maximum stack diagonal dimension of the stranded ribbon stack 20.

The foam layer 32 may be formed from a foamed material that is peelable to allow for easy access to the subunit 28 or the foam layer 32 may have a tear feature to help facilitate easy access to the subunit 28. In-process extrusion also offers the ability to shape the foam layer for mechanical performance or vary the cell size within the foam layer. In accordance with other aspects of the present disclosure, foam cells may form helically to the path of the ribbons or elongate due to the extrusion draw.

The material of the foam layer 32 may be comprised of, but not limited to, thermoplastic elastomers, polyethylene, polypropylene, polyolefin elastomers, copolymers of polypropylene and polyethylene, polyurethanes, and ethylene-vinyl acetate or other ethylene copolymers. The foamed material may contain one or more thermoplastic elastomer to form blends, for example, LLDPE/POE. The foamed material may contain nucleating agents and/or chemical foaming agents. The foamed material may further contain flame retardants, which may be either highly filled inorganic fillers or intumescent flame retardant packages.

The desired level of foaming to form the extruded foam layer 32 is greater than 25%, preferably greater than 50%, and even more preferably greater than 75%. For example, a formulation for the foam layer 32 may include 70% Dow Infuse 9807, 28% Dow Agility 1021 LDPE, 2% Masterbacth talc and 0.8% $CO_2$. Density of the layer may be reduced 65% to have a compression modulus of 0.231 MPa. A thickness of the foam layer 32 may be between 1.0 mm and 2.0 mm thick at its minimum thickness. An inner diameter of the extruded foam layer 32 will be determined by the geometry of the ribbon stack 20. An outer diameter of the extruded foam layer 32 will be determined by the largest ribbon stack diagonal plus the minimum thickness of the foam layer 32.

The desired compressive modulus of the foam layer 32 should be sufficiently low to prevent attenuation during bending, but high enough to provide some protection during crush testing by distributing load across more fibers for low attenuation. The preferred compression modulus may be less than 10 MPa, more preferably less than 5 MPa, and even more preferably less than 1 MPa. This low compression modulus may be achieved by either selecting a material with an inherently low modulus, or more preferably physically or chemically foaming a higher modulus material to achieve the desired modulus. The material may also have minimal compression set to preserve the tightness of the ribbon stack, exhibiting less than 40% compression set, and preferably less than 20% compression set. Compression set may be defined as the amount of permanent deformation that remains after a set load or strain is applied to the material for a predetermined amount of time and then released.

As discussed above, buckling forces within the subunit 28 are limited by several design factors in addition to limiting the residual radial compression due to the material properties the sheath 26, including the relationship of the friction coefficient between ribbons 22, between the ribbons 22 and the sheath 26, and between the sheath 26 and surrounding cable elements. Accordingly, the foamed material may have a low kinetic and static coefficient of friction, both lower than 4, more preferably lower than 2, and even more preferably lower than 1. If necessary to achieve an acceptable coefficient of friction, the foam layer 32 may include a commercially available friction-reducing additive.

For example, to enable efficient longitudinal translation between the subunit 28 within the cable 10 during bending, while ensuring that the ribbon stack 20 and the sheath 26 act as one unit, the friction between the subunit 28 and an enclosing element, such as an armor layer or the jacket 12, should be lower than the friction between the sheath 26 of and the ribbon stack 20 contained therein. This should consider the application of a super-absorbent polymer (SAP) powder, which may be applied directly over and/or under the extruded foam layer.

An enclosing layer 34, such as armor or armor tape, or a water-swellable tape, for example, may be provided to surround the extruded foam layer 32 between the foam layer 32 and the jacket 12. As shown in FIGS. 1-3, the enclosing layer 34 may be of two-piece armor construction, having a first armor piece 36 and a second armor piece 38 with overlap regions 40 where one of the first armor piece 36 and the second armor piece 38 is formed to overlap for a short distance over one of the other of the first armor piece 36 and the second armor piece 38.

The enclosing layer 34 generally extends all or substantially all of the axial length of cable 10 and provides an additional layer of protection to the subunit 28 and the optical fiber ribbons 22 therein, and may provide resistance against damage (e.g., damage caused by contact or compression during installation, damage from the elements, damage from memberents, etc.).

Each of the first armor piece 36 and the second armor piece 38 may be bent, molded or otherwise shaped to include a plurality of alternating peaks and troughs 42 (i.e., corrugated). The peaks and troughs 42 generally extend in the circumferential direction at least a portion of the distance around each of the first armor 36 and the second armor piece 38. Cable 10 also includes one or more elongate strength elements, shown as strength members 44, that extend in the longitudinal direction within cable jacket 12, and generally provide increased tensile strength to cable 10. As shown, strength members 44 may be fully embedded or at least partially embedded in cable jacket 12 and are located adjacent to the enclosure layer 34. Further, in the embodiment shown, the plurality of peaks and troughs 42 of each of the first armor piece 36 and the second armor piece 38 extend in the circumferential direction substantially the entire distance between opposing members 44.

As shown in FIGS. 1-3, cable 10 includes at least one longitudinally extending channel, recess or depression, shown as channels 46, that are defined in the outer surface of the enclosure layer 34. Members 44 are positioned such that at least a portion of members 44 reside in channels 46 and extend longitudinally within channels 46. In the particular embodiments shown, cable 10 includes two channels 46, one formed in each of the first armor piece 36 and the second armor piece 38, and each receiving one member 44. The two channels 46 are spaced at least 90 degrees from each other and more specifically are about 180 degrees from each other (e.g., such that the circumferential center points of channels 40 are spaced 180 degrees plus or minus 10 degrees from each other).

In some such embodiments, cable 10 includes two channels 46 and two members 44. However, in other embodiments, cable 10 may include a variety of different strength member arrangements, such as four strength members 44, wherein each channel 46 may be formed to accommodate two strength members 44 or there may be four channels 46, for example, with one or two strength members 44 in each channel 46.

Further, in accordance with yet other aspects of the present disclosure, both members 44 and channels 46 extend substantially the entire longitudinal length of the enclosure layer 34, of cable 10 and/or of cable jacket 12 between opposing first and second ends of the enclosure layer 34, cable 10 and/or cable jacket 12. In embodiments having channels 46 that extend the entire length of cable 10, channels 46 are recessed, in the radial direction, below all of peaks along the length of cable 10. Further, channels 46 and members 44 are substantially parallel to the longitudinal axis 48 of the cable 10 (at least when cable 10 is straightened), and in this arrangement, members 44 are unwrapped relative to the enclosure layer 34 and/or relative to longitudinal axis 48 such that the length of members 44 is substantially the same as the length of cable 10 and/or the length of the enclosure layer 34 (e.g., within plus or minus 5%, within plus or minus 0.1%, or within plus or minus 0.01%).

In general, by incorporating longitudinal channels 46 into the enclosure layer 34 such that members 44 are recessed at least part of the radial distance into each of the first armor piece 36 and the second armor piece 38, the diameter of cable 10 and the thickness of cable jacket 12 can be reduced while at the same time maintaining a generally circular outer perimeter of cable 10. Thus, it is believed that the design of the enclosure layer 34 discussed herein allows for formation of a cable that is lighter, has a smaller outer diameter and is more flexible, while maintaining strength of the enclosure layer 34, compared to conventional cable designs in which strength members 44 are not recessed within the enclosure layer 34.

In accordance with yet other aspects of the present disclosure, the two-piece armor design of the enclosure layer facilitates fast access to the subunit 28. For example, as shown in detail in FIG. 2, a discontinuity 50 may be co-extruded near the armor overlap 40. The jacket 12 may comprise a medium density polyethylene (MDPE) and the feature may be a co-polymer polypropylene with 6-9% polyethylene (Ineos N05U-00). The two materials are co-extruded to form the single layer jacket 12 with the areas of discontinuity 50. Placement of the discontinuities 50 may be 1 to 3 mm from an outer overlap edge to provide the required mechanical performance and peel force requirements. Jacket separation features are disclosed, for example, in U.S. Pat. Nos. 6,017,415 and 8,582,940, the entirety of each of which are incorporated by reference herein.

The enclosure layer 34 may be provided with a laminate (PE/EAA or PE) that directly bonds to the MDPE jacket 12. During end or mid-span, a section of the jacket 12 and one or the other of the first armor piece 36 or the second armor piece 38 may separate together for direct access to the ribbon stack subunit. No talc, adhesive, or ripcords are required for bonding control or access. However, a water-swellable adhesive may be used in the armor overlap 40.

Key features in the armor design of the enclosure layer 34 include the two-piece nature of the desing and the variable radial corrugation height that provides the channels 46 for placement of the strength members 50. Moreover, incorporating non-round cross-sectional shapes for the strength members 44, such as the ovular shape shown in FIGS. 1-3 or rectangular shape, further contribute to reduction in the outside diameter of the cable 10. The strength members may have a cross-sectional minimum dimension and a cross-sectional maximum dimension. The cross-sectional minimal dimension of the strength members 44 may align with the jacket wall thickness. Accordingly, the configuration of the strength members 44 allows the cable 10 to maintain a 0.7 mm minimum jacket wall thickness over the strength members 44 while maintianing an overall cable outside diameter that is round. Non-round strength members 44 and reduced corrugation height significantly reduce the MDPE in the jacket 12 and the overall cable outside diameter. The nominal corrugation may be 0.68 mm from peak to peak outside of the channel 46 incorporating the strenght members 44, and the corrugation may be reduced to 0.2-0.3 mm within the channels 46. The minimum strength member 44 dimension may be 0.7 mm.

Moreover, as shown in FIGS. 1-3, by embedding the strength members 44 entirely in the single layer jacket 12, water penetration in the area of the strength members 44 is sealed by the jacket 12 and requires no adhesive or SAP. It also allows for complete radial bonding between the jacket 12 and strength members 44 and also between the jacket 12 and enclosure layer 34 for improved mechanical performance. The strength members 44 may be dielectric rigid/semi-rigid strength members, such as glass-reinforced polymer (GRP) members, although other suitable materials (e.g. steel) and/or cross-sections may be used. The strength members 44 may be encapsulated in a suitable bonding material, such as an ethyl acrylic acid (EAA) copolymer material, to enhance the bonding characteristics of the strength members 44 to the jacket 12. The strength members 44 may thus provide tensile strength to the cable 10 while providing resistance to jacket shrinkage during the jacket extrusion process and cold weather cycling down to −40° C.

The non-kinking jacket 12 may be an extruded polymer jacket having a thickness of between 2.5 mm and 5 mm, a co-extruded polymer jacket with a bonded nylon layer, for example, having the same thickness, or a dual-layer jacket of similar thickness with stranded strength elements between the layers. The stranded strength elements may be aramid yarns or impregnated fiberglass strands, for example, that cover 50-100% of the inner jacket layer and allow portions of the outer jacket layer to bond to the inner jacket layer during the extrusion process.

A ripcord may be provided to, upon application of a sufficient outwardly directed pulling force, rip through at least a portion of one of the cable components, for example, the enclosing element 34 and/or the jacket 12 to provide access to the subunit 28.

The ribbons 22 may be comprised of 250 μm or 200 μm optical fibers encased in a conventional cured ribbon matrix. By changing the fiber size from 250 μm to 200 μm, and increasing the number of fibers in the subunit 28, may result in even higher fiber densities when comparing similar fiber counts and cable dimensions. Maintaining the more solid ribbon matrix overcomes difficulties in handling and splicing experienced with the rollable ribbon type ribbons. Mass fusion splicing of multiple 12 fiber 250 μm ribbons, for example, is easier and faster than similar mass fusing splicing of the flexible rollable ribbons and much easier and faster than field ribbonized loose fibers or single fiber mass fusion.

Figure 4:
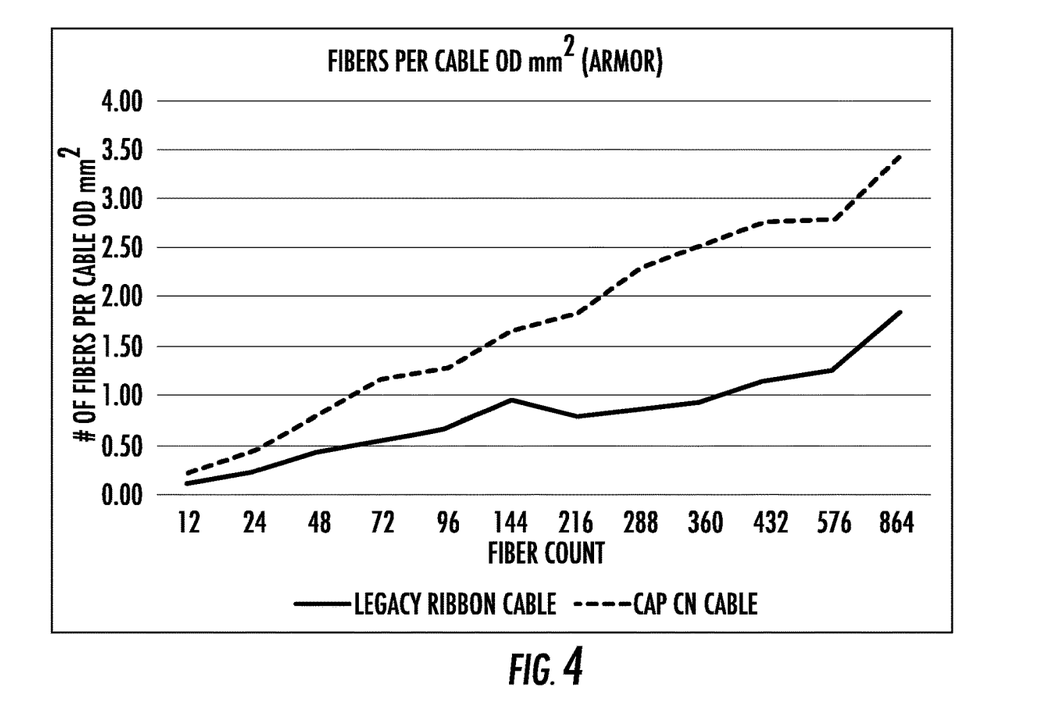
FIG. 4 is a table illustrating a comparison of fiber densities for the cables shown in FIGS. 1-3 as compared to conventional ribbon cables, in accordance with aspects of the present disclosure.

The combination of features disclosed herein enables a cable 10 that has a reduced cable outside diameter with less free space in the interior, providing cables with higher fiber densities. As shown in FIG. 4, the cable 10 of FIGS. 1-3, identified as CAP CN in the chart, may have more fibers per cable cross-sectional area (computed based on outside diameter) when compared to conventional ribbon cables for the particular fiber counts shown.

Figure 5:
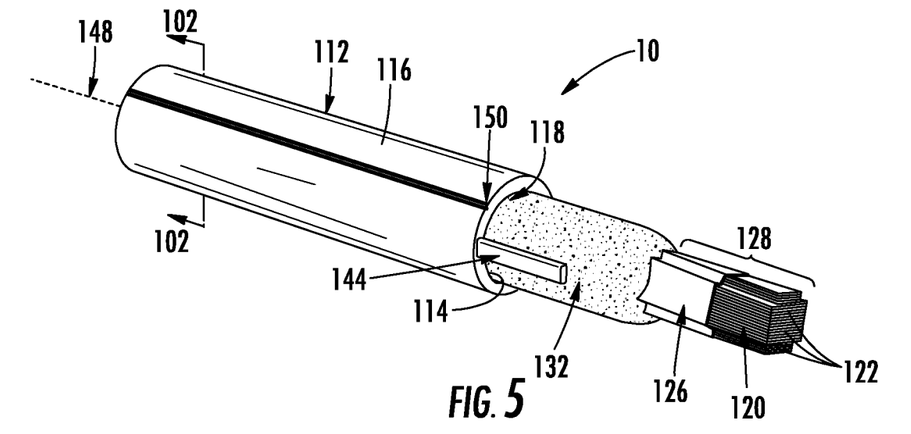
FIG. 5 is an isometric view of another fiber optic cable in accordance with aspects of the present disclosure.
Figure 6:
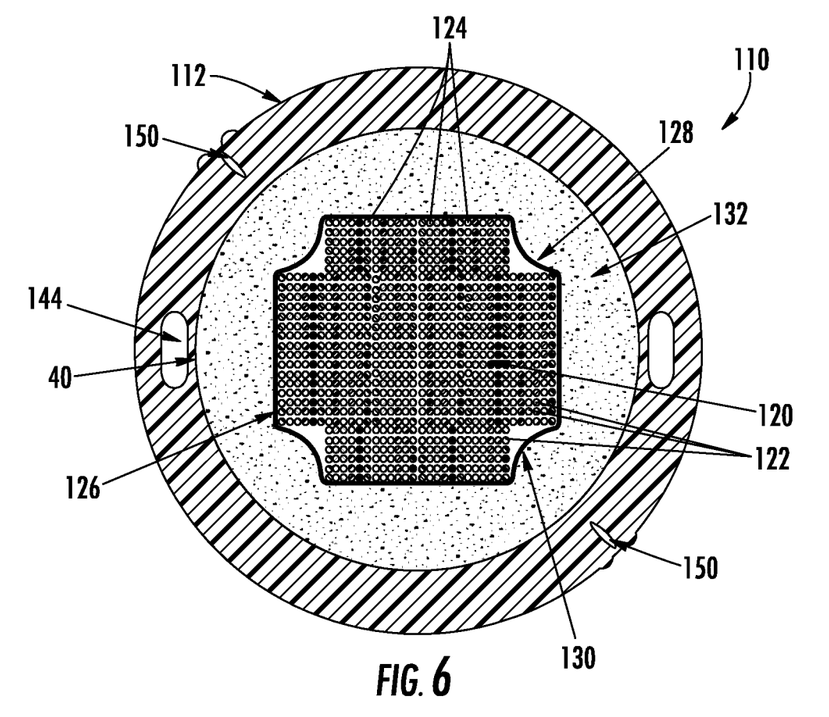
FIG. 6 is a cross-sectional view of the fiber optic cable of FIG. 5 taken along line 102-102 in accordance with aspects of the present disclosure.

FIGS. 5 and 6 depict an embodiment of an optical fiber cable 110. The optical fiber cable 110 includes a cable jacket 112 having an inner surface 114 and an outer surface 116. The outer surface 116 defines an outermost surface of the optical fiber cable 110. The inner surface 114 of the cable jacket 112 defines a longitudinal bore 118. Disposed within the bore 118 are optical communication elements. In the embodiment depicted, the optical communication elements include a stack 120 of optical fiber ribbons 122. Each optical fiber ribbon 122 includes a plurality of optical fibers 124 arranged in a planar configuration and bound together, e.g., with a matrix material. In embodiments, the stack 120 includes, e.g., from one to thirty-two optical fiber ribbons 122. In embodiments, each optical fiber ribbon 122 includes from four to thirty-six optical fibers 124. Thus, in embodiments, the optical fiber cable 110 may include, e.g., anywhere from four to 864 optical fibers 124 in the bore 118.

In accordance with aspects of the present disclosure, as depicted in FIGS. 5 and 6, the stack 120 of optical fiber ribbons 122 may include a sheath 126 of polymer material extruded about the ribbon stack 120 to maintain stack integrity while providing a flexible, routable subunit 128. This peelable sheath 126 allows for ribbon stack integrity and subunit routing, while also allowing for stack twist-tightening during cable bending.

The sheath 126 may be made of a peelable plasticized polyvinyl chloride (PVC) material tightly extruded to surround the ribbon stack 120. The sheath 126 may be a single extruded layer of plasticized PVC that is both thin (e.g., a thickness of between 0.15 mm and 0.5 mm, preferably about 0.25 mm) and comprised of a soft material that easily separates by manually pinching the sheath material.

The extruded sheath 126 is tight in that it conforms to the shape of the ribbon stack 120 and keeps all the individual ribbons 122 acting as a whole during longitudinal translation within the subunit 128 inside the cable 110 during cable bending. By maintaining all the ribbons 122 acting as a whole, the core subunit 128 in accordance with aspects of this disclosure keeps any one ribbon 122 from buckling during cable bending. The ability of the sheath 126 to perform this function would also keep any one fiber in a rollable ribbon format from buckling during subunit longitudinal translation. Although embodiments disclosed herein may have an entirely continuous sheath 126, i.e., whole simultaneously in a radial and a longitudinal direction along the entire length or substantially the entire length of the cable, embodiments may also include a sheath 26 having non-continuous features, such as holes, windows, slits, or gaps, for example, such that a surface area of the sheath 126 with the non-continuous features is at least 50% of the surface area if the sheath 126 was entirely continuous. The sheath 126 has the same material properties described above with respect to sheath 26.

The conformal sheath 126 has a fiber fill ratio greater than the maximum fill ratio of a round tube. As a result, the conformal sheath 126 may rotate with the ribbon stack due to mechanical interference associated with the non-circular shape of the ribbon stack 120. The sheath 126 also secures the relative position of each ribbon 122 within the ribbon stack 120 and presents a consistent boundary between the edges of the ribbon stack 120 and surrounding cable elements.

As shown in FIGS. 5 and 6, the sheath 126 may be extruded around a stack of conventional ribbons 122 arranged in a stepped configuration, where the ribbons are two different widths (e.g., 24F ribbons and 36F ribbons). As shown in FIG. 6, the ribbons 122 may be stacked with a central grouping of sixteen 36F fiber ribbons and a group of six 24F ribbons provided on each side of the central grouping for a total of 864F in the ribbon stack 120. However, the extruded sheath 126 may be applied to any of a number of fiber stack arrangements.

Although the sheath 126 is described above as tight, at the same time the extruded sheath 126 is loose or just loose enough such that when a length of the subunit 128 is bent and coiled, the individual ribbons 122 are free to adjust themselves longitudinally with respect to each other, longitudinally translating inside or within the extruded sheath 126, relieving bending stresses and keeping the individual ribbons 122 from buckling. The special material of the sheath 126 does not squeeze radially or continue to squeeze radially and create normal forces between the ribbons or fibers that would hinder subunit 128 longitudinal translation.

The ribbon stack 120 may be stranded to twist longitudinally within the sheath 126. The stranded laylength of the ribbon stack 120 should be in the range of 300-900 mm depending on the fiber count (e.g., 12, 24 or 36 fiber ribbons).

The sheath 126 may be a continuously (radially and longitudinally continuous) applied thermoplastic material. Optical fibers and ribbons made from optical fibers have a high tensile rigidity due to the strength of the glass fibers but a low buckling threshold due the small diameter of each fiber. Bending performance is enhanced by stranding but the optical fibers must be able to slide by compressive force applied at distance of about ¼ of the stranding pitch without buckling to prevent signal loss. The conformal sheath 126 functions as a boundary to limit separation between the ribbons 122 within the stack 120 due to buckling forces during normal handling of the cable 110 or subunit 128. The continuous sheath 126 prevents localized ribbon or fiber buckling issues that can occur in cables with unbound ribbons or fibers or in cables with ribbon or fibers bound with binder yarns, for example, wherein there is sufficient free space or gaps for the fibers or ribbons to buckle through the binders. These macrobend events can be described as statistical outliers, where the majority of fiber length does not have a bend problem, but only a very small fraction of the length has a bend or buckling problem. Much of optical cable design and attenuation performance in standard loose tube fiber optic cables, or in cables with less than 50% area ratio comes down to managing outlier attenuation bends. For a fiber optic cable to have good attenuation in bending and tension during installation, handling, and lifetime operation, the fibers individually and in aggregate must be able to find a path to relieve bending stresses, whether tensile or contractive.

By having a subunit fiber density of 30% or greater, but more preferably 40%, or most preferably 50% or greater inside the continuous extruded sheath 126, individual fibers of a rollable ribbon cannot find their own path separate from the subunit group that would cause macrobending attenuation outliers. On the other hand, a ribbon stack 120 with high fiber density inside the extruded sheath 126 ensures that individual ribbons 122 are not capable of buckling.

Conventional stranded ribbon cable designs require free space for two main purposes. Free space allows the ribbon stack to move in and out of plane during cable bending, leaving space between the inside wall of the buffer tube and the ribbon stack to prevent attenuation on the corner fibers. As the free space is reduced, the ribbon stack is confined to a smaller range of planes during bending and will contact the inside of the hard buffer tube causing attenuation, particularly at the point loads on the corner fibers. Freespace also provides attenuation performance during crush testing. As the cable is crushed, the deflection of the cable/buffer tube causes similar point loads and attenuation on the corner fibers when freespace is minimal and the deflection is high.

To minimize these point loads during bending and crush testing, and to facilitate smaller diameter cables, foamed material can be used to disperse applied forces over a long length and across more fibers. However, the foamed material must still allow the subunit 128 (i.e., ribbon stack) to move in and out of plane during bending. These two competing functions require the foam material to have certain physical and mechanical properties for this cable to have acceptable optical performance.

As shown in FIGS. 5 and 6, for example, one of the cable elements surrounding the ribbon stack 120 may be an extruded foam layer 132. The foam layer 132 may be extruded in-process during manufacture of the cable, as compared to foam tapes applied in a separate process for many conventional designs. The foam layer 132 may be extruded directly on or about the ribbon stack subunit 128 to have no point of separation, radial or longitudinal.

The foam layer 132 may be formed from a foamed material that is peelable to allow for easy access to the subunit 128 or the foam layer 132 may have a tear feature to help facilitate easy access to the subunit 128. In-process extrusion also offers the ability to shape the foam layer for mechanical performance or vary the cell size within the foam layer. In accordance with other aspects of the present disclosure, foam cells may form helically to the path of the ribbons or elongate due to the extrusion draw.

The material of the foam layer 132 may be comprised of, but not limited to, thermoplastic elastomers, polyethylene, polypropylene, polyolefin elastomers, copolymers of polypropylene and polyethylene, polyurethanes, and ethylene-vinyl acetate or other ethylene copolymers. The foamed material may contain one or more thermoplastic elastomer to form blends, for example, LLDPE/POE. The foamed material may contain nucleating agents and/or chemical foaming agents. The foamed material may further contain flame retardants, which may be either highly filled inorganic fillers or intumescent flame retardant packages.

The desired level of foaming to form the extruded foam layer 132 is greater than 25%, preferably greater than 50%, and even more preferably greater than 75%. For example, a formulation for the foam layer 132 may include 70% Dow Infuse 9807, 28% Dow Agility 1021 LDPE, 2% Masterbacth talc and 0.8% $CO_2$. Density of the layer may be reduced 65% to have a compression modulus of 0.23 MPa. A thickness of the foam layer 132 may be between 1.0 mm and 2.0 mm thick at its minimum thickness. An inner diameter of the extruded foam layer 132 will be determined by the geometry of the ribbon stack 120. An outer diameter of the extruded foam layer 132 will be determined by the largest ribbon stack diagonal plus the minimum thickness of the foam layer 132.

The desired compressive modulus of the foam layer 132 should be sufficiently low to prevent attenuation during bending, but high enough to provide some protection during crush testing by distributing load across more fibers for low attenuation. The preferred compression modulus may be less than 10 MPa, more preferably less than 5 MPa, and even more preferably less than 1 MPa. This low compression modulus may be achieved by either selecting a material with an inherently low modulus, or more preferably physically or chemically foaming a higher modulus material to achieve the desired modulus. The material may also have minimal compression set to preserve the tightness of the ribbon stack, exhibiting less than 40% compression set, and preferably less than 20% compression set. Compression set may be defined as the amount of permanent deformation that remains after a set load or strain is applied to the material for a predetermined amount of time and then released.

As discussed above, buckling forces within the subunit 128 are limited by several design factors in addition to limiting the residual radial compression due to the material properties the sheath 126, including the relationship of the friction coefficient between ribbons 122, between the ribbons 122 and the sheath 126, and between the sheath 126 and surrounding cable elements, such as the jacket 112. Accordingly, the foamed material may have a low kinetic and static coefficient of friction, both lower than 4, more preferably lower than 2, and even more preferably lower than 1. If necessary to achieve an acceptable coefficient of friction, the foam layer 132 may include a commercially available friction-reducing additive.

For example, to enable efficient longitudinal translation between the subunit 128 within the cable 110 during bending, while ensuring that the ribbon stack 120 and the sheath 126 act as one unit, the friction between the subunit 128 and the jacket 112 should be lower than the friction between the sheath 126 of and the ribbon stack 120 contained therein. This should consider the application of a super-absorbent polymer (SAP) powder, which may be applied directly over and/or under the extruded foam layer.

As shown in FIGS. 5 and 6, cable 110 includes at least two strength members 144. However, in other embodiments, cable 110 may include a variety of different strength member arrangements, such as four strength members 144. Both members 144 extend substantially the entire longitudinal length of cable 110 and/or of cable jacket 112 between opposing first and second ends of the cable 110 and/or cable jacket 112.

In accordance with yet other aspects of the present disclosure, the jacket 112 of the cable 110 may facilitate fast access to the subunit 128. For example, as shown in detail in FIG. 6, the jacket may be extruded with one or more discontinuities 150. The jacket 112 may comprise a medium density polyethylene (MDPE), for example, and the discontinuity feature 150 may be a co-polymer polypropylene with 6-9% polyethylene (Ineos N05U-00). The two materials are co-extruded to form the single layer jacket 112 with the areas of discontinuity 150. Jacket separation features are disclosed, for example, in U.S. Pat. Nos. 6,017,415 and 8,582,940, the entirety of each of which are incorporated by reference herein.

The strength members 144 may be entirely embedded in the single layer jacket 112. Thus, water penetration in the area of the strength members 144 is sealed by the jacket 112 and requires no adhesive or SAP. It also allows for complete radial bonding between the jacket 112 and strength members 144 and also between the jacket 112 and foam layer 132, if intended, for improved mechanical performance. The strength members 144 may be dielectric rigid/semi-rigid strength members, such as glass-reinforced polymer (GRP) members, although other suitable materials (e.g. steel) and/or cross-sections may be used. The strength members 144 may be encapsulated in a suitable bonding material, such as an ethyl acrylic acid (EAA) copolymer material, to enhance the bonding characteristics of the strength members 144 to the jacket 112. The strength members 144 may thus provide tensile strength to the cable 110 while providing resistance to jacket shrinkage during the jacket extrusion process and cold weather cycling down to −40° C.

The non-kinking jacket 112 may be an extruded polymer jacket having a thickness of between 2.5 mm and 5 mm, a co-extruded polymer jacket with a bonded nylon layer, for example, having the same thickness, or a dual-layer jacket of similar thickness with stranded strength elements between the layers. The stranded strength elements may be aramid yarns or impregnated fiberglass strands, for example, that cover 50-100% of the inner jacket layer and allow portions of the outer jacket layer to bond to the inner jacket layer during the extrusion process.

In addition to the fast access features 150 described above, a ripcord may be provided to, upon application of a sufficient outwardly directed pulling force, rip through at least a portion of one of the cable components, for example, the foam layer 132 and/or the jacket 112 to provide access to the subunit 128.

The ribbons 122 may be comprised of 250 μm or 200 μm optical fibers encased in a conventional cured ribbon matrix. By changing the fiber size from 250 μm to 200 μm, and increasing the number of fibers in the subunit 128, may result in even higher fiber densities when comparing similar fiber counts and cable dimensions. Maintaining the more solid ribbon matrix overcomes difficulties in handling and splicing experienced with the rollable ribbon type ribbons. Mass fusion splicing of multiple 12 fiber 250 μm ribbons, for example, is easier and faster than similar mass fusing splicing of the flexible rollable ribbons and much easier and faster than field ribbonized loose fibers or single fiber mass fusion.

Figure 7:
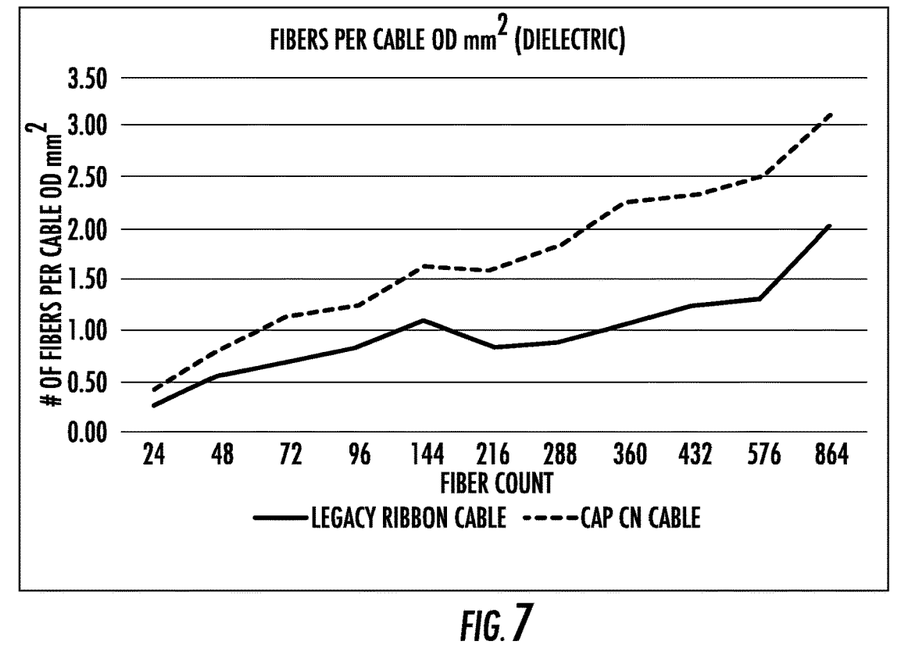
FIG. 7 is a table illustrating a comparison of fiber densities for the cables shown in FIGS. 5 and 6 as compared to conventional ribbon cables, in accordance with aspects of the present disclosure.

The combination of features disclosed herein enables a cable 110 that has a reduced cable outside diameter with less free space in the interior, providing cables with higher fiber densities. As shown in FIG. 7, the cable 110 of FIGS. 5 and 6, identified as CAP CN in the chart, may have more fibers per cable cross-sectional area (computed based on outside diameter) when compared to conventional ribbon cables for the particular fiber counts shown.

The reduced cable sizes through the combination of features described herein is substantial. For example, an 864 fiber dielectric cable, as shown in FIGS. 5-6, may have an outside diameter of less than 19 mm, in particular 18.9 mm, versus 23.4 mm in the conventional ribbon cable designs. This allows an 864f dielectric cable to fit in a 1-inch duct. This advantage can also be evaluated in terms of fiber density (total fiber cross-sectional area/cable cross-sectional area). For example, the 864f design illustrated in FIGS. 5 and 6, may have a fiber density that is 19.3% versus less than 13% in the conventional designs. Another way to evaluate fiber density is fibers per cable outside diameter (OD) cross-sectional area. The 864f cable 100 shown in FIGS. 5 and 6 may contains 3.4f per mm$^2$ versus 1.9f per mm$^2$ in conventional designs.

The cables disclosed herein provide improved cable end and mid-span access. Conventional single tube ribbon designs contain ripcords and require significant effort to access. The features disclosed hererin, including the two-piece armor of the enclosure layer and/or a jacket having discontinuities to provide fast access, improve end and mid-span access to the subunit.

Improved ribbon routing is another advantage of the cables disclosed herein. The sheath comprised of a a thin layer of polymer that surrounds the ribbon stack, creates a unitary subunit which may be easily routed to the splice tray and may act as a furcation once separated from the jacket and/or foam layers, without the risk of attenuation or kinking. No post cable access furcation is required.

The cables disclosed herein are manufactured, depending on the fiber count, 12, 24 or 36f ribbons, by rigidly stranded the ribbon stack at a 300-900 mm laylength along with a sodium polyacrylate powder (SAP) into the subunit layer extrusion process. During the subunit layer extrusion process, the sheath is extruded onto the ribbon stack. The subunit then enters the foaming extrusion process along with a SAP powder. The foam layer is formed around the subunit and along with a SAP powder enters the armoring process where separate armor layers are formed and applied. The armored unit along with strength elements enter the jacketing extrusion process where the MDPE and fast access discontinuity features are applied. Because the steps are in tandem, cable attributes such as dimensions and ERL improve in process capability.

A primary advantage of the cables disclosed hererin over conventional designs, including those with rollable ribbons, is ease of splicing. With rollable ribbon, much effort is required to identify and ribbonize fibers for splicing. The cables disclosed hererin use conventional ribbons for easy identification and splicing.

The present inventions have thus been described with reference to the exemplary embodiments, which embodiments are intended to be illustrative of inventive concepts rather than limiting. Persons of ordinary skill in the art will appreciate that variations and modifications of the foregoing embodiments may be made without departing from the scope of the appended claims. The step-like profile can include the interposition of a subgroup having a larger or smaller fiber count than neighboring subgroups. Each ribbon/subunit in a subgroup can be marked for ease of identification even in the event the subgroup shifts during cable bending. Further, the optical fiber subgroups can respectively include generally unequal optical fiber counts (not shown). Optical fibers that are less bend-sensitive can be placed in predefined locations in a group/subgroup/ribbon for maintaining a low overall attenuation of the fiber optic cable.

The invention claimed is:

1. An optical fiber cable comprising:
    a jacket having an inner surface and an outer surface, the outer surface defining an outermost surface of the optical fiber cable and the inner surface defining a longitudinal bore;
    a stranded ribbon stack disposed within the longitudinal bore, the stranded ribbon stack comprising a stepped configuration with a central grouping of ribbons, a first side grouping of ribbons disposed on first side of the central grouping, and a second side grouping of ribbons disposed on a second side of the central grouping opposite to the first side, the ribbons of the central grouping comprising a first number of optical fibers and the ribbons of the first and second side groupings comprising a second number of optical fibers, the second number being less than the first number;
    a sheath extruded around the stranded ribbon stack to form a subunit, the sheath comprising portions in contact with the ribbon stack and bridging portions spanning steps of the stepped configuration; and
    an extruded foam layer disposed between the subunit and the inner surface of the jacket, wherein the foam layer has a minimum inner diameter that is less than or equal to a maximum stack diagonal dimension of the stranded ribbon stack.

2. The cable of claim 1, wherein
    the jacket has at least one discontinuity that provides for easy access to the subunit.

3. The cable of claim 2, wherein the cable further comprises:
    a strength element embedded entirely in the jacket.

4. The cable of claim 3, wherein the cable further comprises:
    an enclosure layer provided between the foam layer and the jacket and surrounding the foam layer and the subunit.

5. The cable of claim 4, wherein the enclosure layer comprises a first armor piece and a second armor piece having an overlap, and wherein the at least one discontinuity is situated proximate to the overlap.

6. The cable of claim 3, wherein the enclosure layer further comprises at least one longitudinal channel, and wherein the strength element extends longitudinally while situated at least partially in the channel.

7. The cable of claim 1, wherein the ribbon stack is stranded to have a lay length of between 300 and 900 millimeters.

8. The cable of claim 1, wherein the foam layer has a compression modulus of less than 1 MPa.

9. The cable of claim 8, wherein a thickness of the foam layer is between 1 millimeter and 2 millimeters.

10. The cable of claim 8, wherein the foam layer has a compression set of less than 40%.

11. The cable of claim 8, wherein the foam layer has a compression set of less than 20%.

12. The cable of claim 1, wherein the cable has an outside diameter of less than 19 millimeters and a corresponding fiber density of at least 3.4 fibers per square millimeter.

13. A method of manufacturing an optical fiber cable, the method comprising:
    rigidly stranding a stack of optical fiber ribbons at a lay length of between 300 and 900 millimeters, the stack of optical fiber ribbons comprising a stepped configuration with a central grouping of ribbons, a first side grouping of ribbons disposed on first side of the central grouping, and a second side grouping of ribbons disposed on a second side of the central grouping opposite to the first side, the ribbons of the central grouping comprising a first number of optical fibers and the ribbons of the first and second side groupings comprising a second number of optical fibers, the second number being less than the first number;
    extruding a sheath onto the ribbon stack to form a subunit, the sheath comprising portions in contact with the stack of optical fiber ribbons and bridging portions spanning steps of the stepped configuration;
    extruding a foam layer around the subunit; and
    extruding a jacket around the foam layer.

14. The method of claim 13, further comprising:
    applying an armor around the foam layer prior to extruding the jacket.

15. The method of claim 14, wherein the armor comprises:
    a first armor piece and a second armor piece.

16. The method of claim 13, further comprising:
    embedding a strength element in the jacket while extruding the jacket.

17. The method of claim 13, wherein the foam layer has a compression modulus of less than 1 MPa and a thickness of the foam layer is between 1 millimeter and 2 millimeters.

18. The method of claim 17, wherein the foam layer has a compression set of less than 40%.

19. The method of claim 17, wherein the foam layer has a compression set of less than 20%.

20. The method of claim 13, wherein the cable has an outside diameter of less than 19 millimeters and a corresponding fiber density of at least 3.4 fibers per square millimeter.

* * * * *